May 18, 1965  J. C. MacMILLAN ETAL  3,183,953
TREE HARVESTER
Filed March 14, 1963  5 Sheets-Sheet 1

INVENTORS
JAMES C. MAC MILLAN &
ROBERT L. SCHMIDT
BY
*William A. Murray*
ATTORNEY May 18, 1965     J. C. MacMILLAN ETAL     3,183,953
TREE HARVESTER
Filed March 14, 1963     5 Sheets-Sheet 2

INVENTORS
JAMES C. MAC MILLAN &
ROBERT L. SCHMIDT
BY
William A. Murray
ATTORNEY

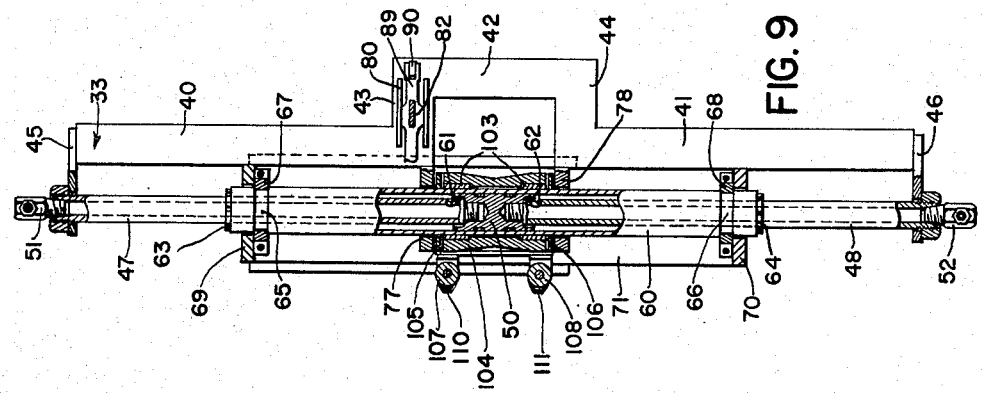
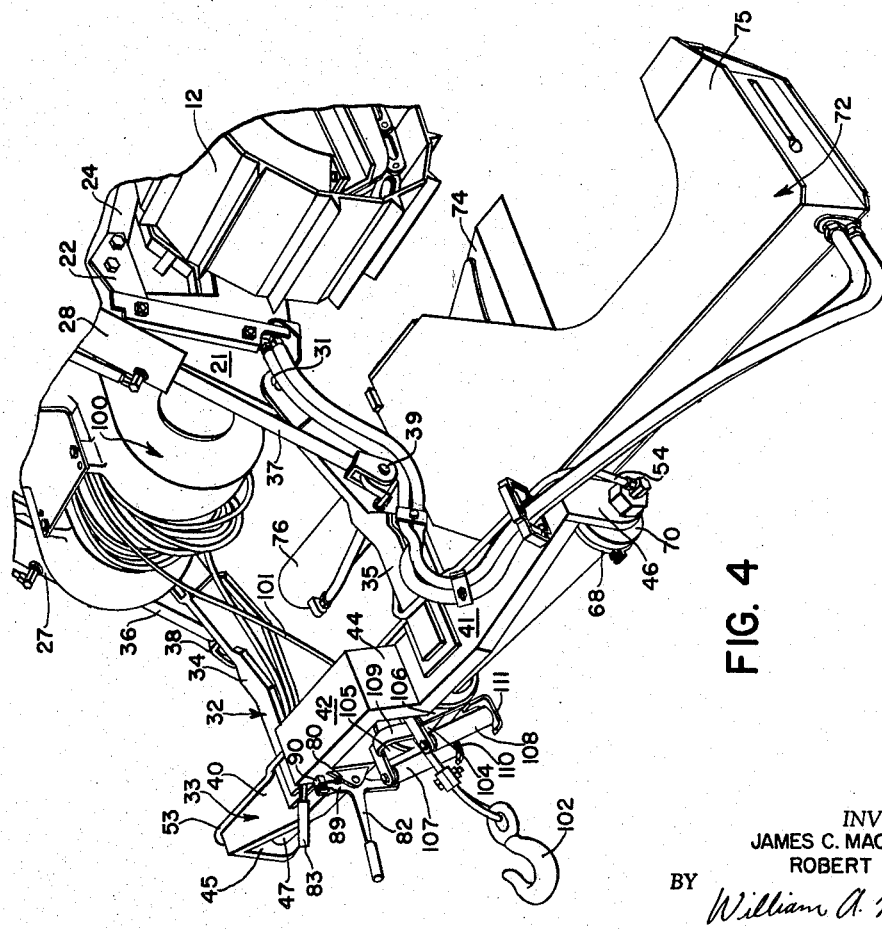

May 18, 1965 J. C. MacMILLAN ETAL 3,183,953
TREE HARVESTER
Filed March 14, 1963 5 Sheets-Sheet 4

INVENTORS
JAMES C. MACMILLAN &
ROBERT L. SCHMIDT
BY
William A. Murray
ATTORNEY

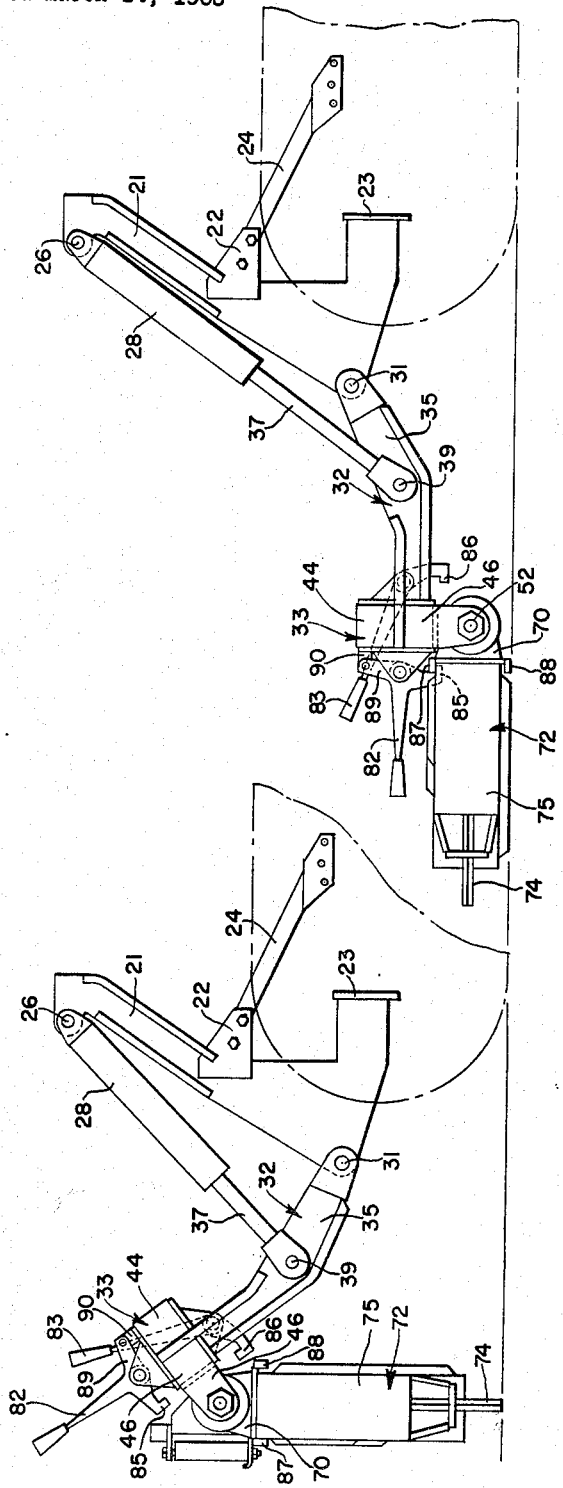

3,183,953
TREE HARVESTER
James C. MacMillan, Rock Island, and Robert L. Schmidt, East Moline, Ill., assignors to Deere & Company, Moline, Ill., a corporation of Delaware
Filed Mar. 14, 1963, Ser. No. 265,241
12 Claims. (Cl. 144—34)

This invention relates to a tree harvester and more particularly to a type of tree harvester incorporating the use of a tree shearing mechanism and a winch device. More particularly this invention relates to a combination tree shear and log arch device utilized to both cut and drag or pull trees and logs.

It is a primary object of the present invention to provide a tree harvesting unit that includes a mobile vehicle such as a tractor and a tree shearing device that may both sever the standing tree as well as to cut a fallen tree into various lengths of logs. Provided with the tree shearing device and as a part thereof is a log arch and a power operated winch used to drag or pull the logs into a desired area.

Specifically it is a primary object of the invention to provide a new and novel type of shearing device including a pair of lift arms supported on the rear end of a tractor with hydraulic means connected thereto to raise and lower the arms. The arms terminate in a rearward transverse extending supporting structure that carries a transverse pivot rod substantially the width of the tractor. As a further object of the invention it is proposed to provide a new and novel type of tree shearing device including a member pivotally supported about the horizontal axis of the rod and having a receiving notch or opening at one side thereof for receiving a tree portion. The member, being pivotally mounted on a main frame supported on the tractor, may be swung forwardly or rearwardly so that the tree-receiving opening faces forwardly or rearwardly. Consequently the tractor may be backed into or moved forwardly to an area of a tree. Provided between the main supporting structure and the aforementioned member are latch means adapted to lock the member in either its forward or its rearward opening disposition.

It is a further object of the invention to provide with the aforementioned supporting structure a cable pulley supported on the rear transverse structure and concentrically mounted relative to the pivot rod. The cable winch, which is supported on the tractor, includes a cable feeding over the cable pulley to a free end rearwardly of the shearing member. Consequently the main supporting structure for the shearing device supports not only the shearing elements, but also operates as a log arch utilized in pulling or dragging the fallen trees or logs by the tractor.

Other objects and advantages of the present invention will become apparent to those skilled in the art as the nature of the invention is better understood from the following description and as shown in the accompanying drawings.

FIG. 2 is a rear perspective view of the tractor and the tree harvesting device showing the shearing mechanism in one position.

FIG. 3 is a view similar to FIG. 1 showing the shearing device in a different position.

FIG. 4 is a side and rear perspective view of the tree shearing device.

FIG. 7 is a view similar to FIG. 5 showing the shearing device in still a further location.

FIG. 8 is a view similar to FIG. 5 showing the shearing device in still a further location.

FIG. 9 is a sectional view taken substantially along the line 9—9 of FIG. 5.

Figure 1:
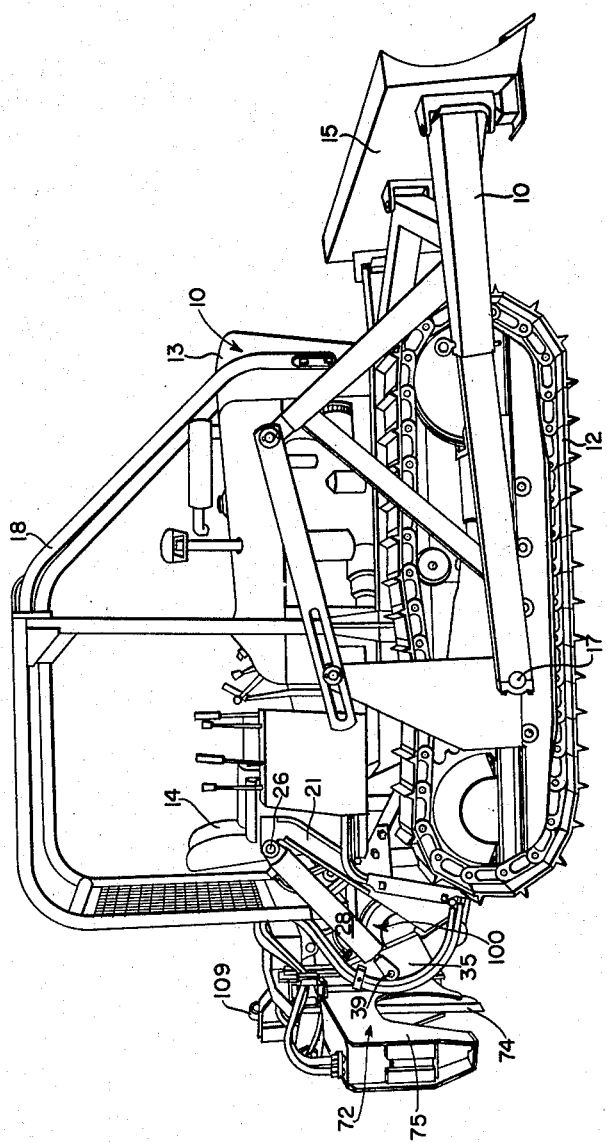
FIG. 1 is a side perspective view of a tractor with the tree harvesting device supported on its rear end and a bulldozer device supported from its forward end.

The harvesting device is normally supported on a mobile vehicle such as a tractor 10 and is probably best utilized on a track-laying type tractor so that it may easily be moved in heavily wooded areas or in areas where there is considerable overgrowth. The tractor 10 is composed of a pair of tracks 11, 12 on opposite sides of a body 13 having an operator's station, indicated by the reference numeral 14, adjacent to the various controls for operating the tractor and its auxiliary equipment.

A bulldozer blade 15 is shown as being positioned forwardly of the tractor. Its supporting structure 16 is pivotally mounted, as at 17, on the sides of the tractor. Suitable hydraulic means, not shown, is positioned between the tractor and bulldozer for raising and lowering the blade 15. An overhead guard 18 is rigidly mounted on the tractor body 10 and safeguards an operator at the operator's station 14 as well as other portions on the tractor from being injured or damaged by falling debris. The blade 15 and the remaining bulldozer structure operates not only in a conventional bulldozer manner but also to counterbalance the tree harvesting mechanism carried on the rear of the tractor 10.

The tree harvesting mechanism is supported on the tractor 10 by a pair of main upright supports 20, 21 adjacent the rear end of the tractor. Metal pads, such as is shown at 22, 23, are provided on the uprights 20, 21 and carry forwardly directed braces 24 bolted at their forward ends to the tractor frame. The pads 22, 23 may also be bolted to the tractor main frame and consequently the main supports 20, 21 become a rigid part of the tractor when so mounted. It should, of course, be recognized that the exact details of the mounting are not important and to a certain extent have been shown only in representative form in the present invention. The supports 20, 21 provide a pair of upper pivot points, such as is shown at 26 (FIGS. 5–8), that carry a pair of downwardly extending hydraulic cylinders 27, 28.

The upright supports 20, 21 carry lower transverse horizontal pivot pins 30, 31 pivotally supporting a U-shaped transverse structure, indicated in its entirety by the reference numeral 32, and composed of a transverse horizontally disposed beam structure 33 and a pair of forwardly directed arms 34, 35 connected at their forward ends to the respective pivot pins 30, 31. The beam structure 32 is raised and lowered by means of the hydraulic cylinders 27, 28 that have their respective rams 36, 37 connected at 38, 39 to the respective arms 34, 35. The beam 33 extends substantially the full transverse expanse of the tractor and is composed of opposite and alined horizontal end portions 40, 41 and an offset central portion 42 joined with the end portions 40, 41 by vertically disposed portions 43, 44. Vertical brackets or flanges 45, 46 are fixed to the ends of the sections 40, 41 and support outer ends of transverse hollow pivot rods 47, 48 respectively, interjoined at their inner ends by a piston member 50. The rods 47, 48 extend outwardly beyond the brackets 45, 46 and are provided with fittings 51, 52 for receiving hydraulic fluid through suitable hoses 53, 54. Controls are provided on the tractor for moving fluid to and from the hollow rods 47, 48.

A cylinder 60 surrounds the adjacent ends of the rods 47, 48. The rods 47, 48 are provided with fluid outlets 61, 62 adjacent the piston 50. Consequently, fluid may be introduced into the cavities between the cylinder 60 and the rod 47 and the cylinder 60 and the rod 48 through the respective fluid passages 61, 62 and from the internal hollow portions of the respective rods 47, 48. The cylinder 60 is closed by suitable means, such as at 63, 64, at its ends. Since the entire rod sections 47, 48 and piston 50 are fixed against transverse movement, movement of fluid to and from the aforementioned cavities will move the cylinder 60 transversely along the respective rods 47, 48. Adjacent opposite ends of the cylinder 60 is a pair of annular grooves 65, 66 for receiving suitable detachable ring assemblies 67, 68. Outward of the respective ring assemblies 67, 68 is a pair of vertical connecting plates or brackets 69, 70 rigidly interconnected by a transverse horizontal plate 71.

The plate portion 71 is fixed by welding or other suitable means to one edge of a jaw-like tree-receiving member 72 that opens at its opposite edge to receive a portion of a tree. The member 72 is of channel or box structure and carries suitable guides, shown partially at 73, for guiding a shearing member 74 against the head end 75 of the jaw member 72. Power means in the form of an hydraulic cylinder 76 is connected to the shearing blade 74 and effects movement of the shearing blade 74 across the opening in the jaw member 72. The cylinder 60 is further supported by a pair of trunnion plates 77, 78 that journals the outer surface of the cylinder 60 and indirectly supports the internal ends of the rods 47, 48.

Reviewing for the moment the structure as described, it will be recognized that the jaw member 72 and its shearing blade 74 is moved transversely across the rear of the tractor by passing fluid through the rods 47, 48 and through the passages 61, 62. Further, it should be recognized that the entire jaw member 72 is pivoted directly about the axis of the rods 47, 48. Consequently, unless otherwise restricted, the mere raising or lowering of the arms 34, 35 will create a gravitational pivoting action of the member 72 relative to the rods 47, 48. Generally, it should be recognized that when in transport position the member 72 will be positioned directly rearwardly of the tractor. However, when it is desired to cut logs or to shear a tree, the member 72 will normally be disposed outside the track 12 and will be faced in the direction desired.

Projecting from the faces of the vertical beam portion 43 are bracket structures 80, 81 pivotally supporting locking levers 82, 83 respectively. The levers 82, 83 are provided with hook-like ends 85, 86 adapted to hook behind latch rods 87, 88 extending from the face of the beam portion 71. A leg 89 is provided on the lever 82 and has pivotally connected thereto a lug 90 that may be moved between the leg 89 and the beam portion 43 so as to prevent accidental unlocking of the latch lever 82.

Figures 5, 6:
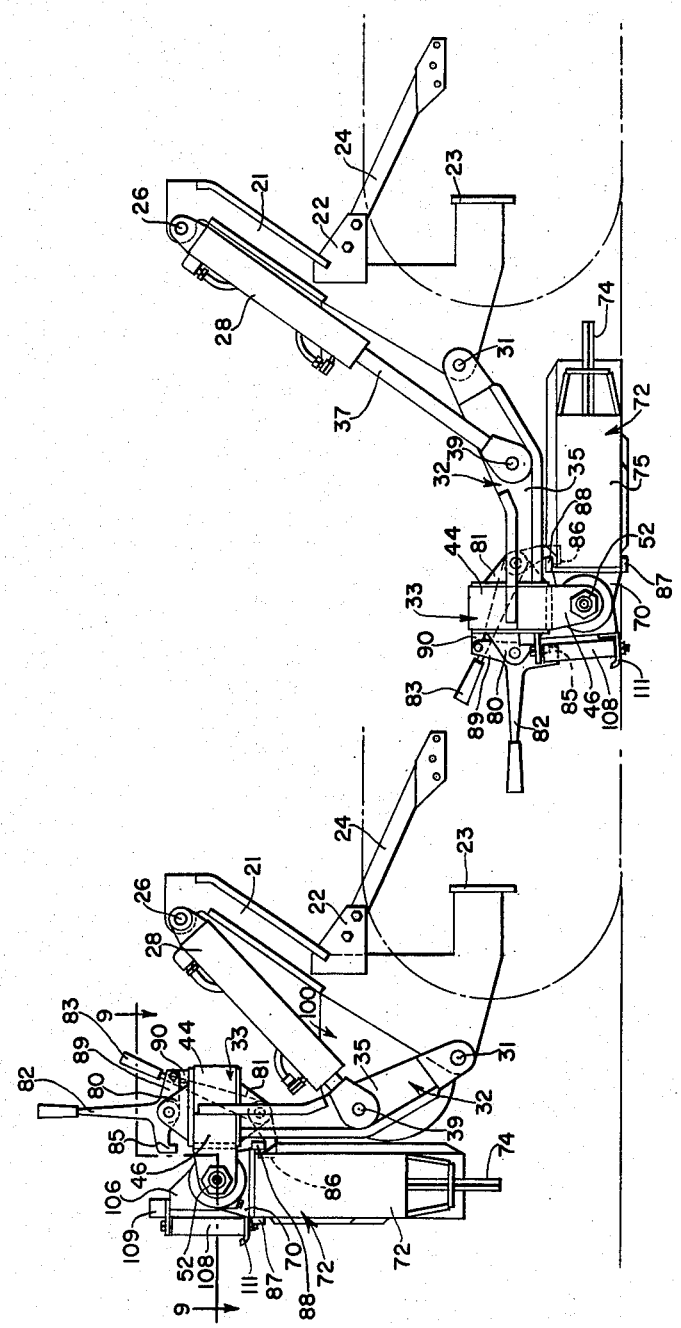
FIG. 5 is a side view of the tree shearing device with portions thereof removed for purposes of clarity and showing the tractor in representative form.
FIG. 6 is a view similar to FIG. 5 showing the shearing device in a different position.

Referring now specifically to FIGS. 5-8, in transport position the cylinders 27, 28 are completely retracted to a position substantially as shown in FIG. 5. In such a position the jaw member 72 will depend in a swinging relation about the axis of the rods 47, 48. If it is desired to lock the tree shearing device in this position, the lever 83 may be swung to a position in which the hook 86 is engaged behind the latch rod 88. Should it be desired to move the tree shearing device in a position in which the opening for receiving the trees opens forwardly or in a position as shown in FIG. 6, it may be done by retaining the lever 83 in the position shown in FIG. 5 and merely extending the hydraulic cylinders 27, 28. By extending the cylinders 27, 28 the arms 34, 35 will move from a vertical position to a horizontal position and similarly the member 72 will move from a vertical to a horizontal position and will face forwardly. In this position trees or logs may be cut by their entering the jaw member 72 from the forward side.

When it is desired to place the jaw member 72 in a position that the three-receiving opening faces rearwardly, it is necessary to partially extend the cylinders 27, 28 in a position shown in FIG. 7 without having either of the levers 82, 83 in locking engagement with their respective latch rods 87, 88. The blade 74 will engage the ground surface. By moving the tractor forwardly, while at the same time further extending the cylinders 27, 28, the tree shearing device will move from a position shown in FIG. 7 to a position shown in FIG. 8. Upon reaching this position the lever 82 may be moved so that the hook 85 engages behind or beneath the latch rod 87. The lug 90 on the arm 89 of the lever 82 will be moved into engagement with the surface of the beam 33 and consequently the lever 82 will be locked against disengagement with the latch rod 87.

Supported on the rear end of the tractor between the tractor rear end and the tree shearing device is a winch structure, indicated in its entirety by the reference numeral 100, having a cable 101 with a free end extending rearwardly and ending in a connection to a hook member 102. Journaled at 103 on the surface of the cylinder 60 is a cable pulley 104. The pulley 104 is located between the junction supports 77, 78 and consequently is retained against axial movement in respect to the rods 47, 48 and is also retained directly beneath the offset portion 42 of the beam 33. The latter, sides 43 and 44, and pulley 104 operate as a retention guide for the cable 101. Consequently, a cable passing through the opening between the offset portion 42 and pulley 104 is retained in the area of the pulley. Also supported on the cylinder 60 and adjacent the ends of the pulley 104 is a pair of upright brackets 105, 106. The brackets 105, 106 carry supporting means for a pair of cable rollers 107, 108 positioned rearwardly of the pulley 104 and adjacent opposite ends thereof. The cable 101 is played over the pulley 104 and between the rollers 107, 108.

As may best be seen from viewing FIGS. 2 and 5, when not in use the entire shearing device is normally carried in a transport position as shown. In this position the pulley 104 is positioned both rearwardly and upwardly relative to the winch 100 so that the cable is played upwardly and rearwardly over the pulley. This is the preferred position for utilizing the pulley 104 and frame member 72 in a log arch use. Positioned over and between the rollers 107, 108 is an arch-shaped strap 109 that retains the cable in a limited vertical movement from the pulley 104. The lower end of the rollers 107, 108 are supported by means that includes skid type elements 110, 111 which permit the lower ends of the rollers to move adjacent the ground without damage thereto. As may best be seen in FIG. 6, when the shearing device is in its forward cutting position, the skids 110, 111 will contact the ground.

It should also be recognized that the entire shearing device will pivot about the axis of the pivot rods 47, 48. Also the pulley 104 will rotate about the same axis and even further the hydraulic cylinder 60 will move lengthwise along the axis. Consequently, all movement of the shearing device, as well as the pulley, will not affect in any manner the operation or the controls of the shearing or the log arch combination.

While only one form of the invention has been shown, it should be recognized that other forms and variations may occur to those skilled in the art. Therefore, while the preferred form is shown for purposes of clearly and concisely illustrating the principles of the invention, it is not the intention to limit or narrow the invention beyond the broad concepts set forth in the appended claims.

What is claimed is:

1. A tree harvester supported on a tractor comprising: a main frame on the rear portion of the tractor including a pair of transverse pivots; a transverse structure disposed rearwardly of the tractor and having forwardly projecting arms supported on the pivots to permit vertical movement of the structure; power means on the tractor for raising and lowering the structure; an elongated horizontal rod mounted on and extending across the structure defining a transverse horizontal pivot; an elongated tree-receiving member pivotally supported on the rod and having an opening at one side thereof for receiving a tree portion; an hydraulic cylinder fixed to move with the member and supported concentrically on the rod; a piston between the rod and cylinder; fluid inlet and discharge means associated with the rod and cylinder for effecting movement of the tree-receiving member transversely relative to the tractor; a tree shearing blade supported on the member for reciprocating motion across the tree-receiving opening; force-transmitting means between the member and blade for effecting the shearing action; a cable pulley on the structure concentric with the rod; a pair of transversely spaced vertical rollers on the structure rearwardly of and on opposite sides of the pulley; a cable winch supported on the tractor between the tractor and structure and having a rearwardly extending cable played over the pulley and between the rollers with a free end rearwardly thereof.

2. A tree harvester supported on a tractor comprising: framework on the tractor including a pair of transverse pivots; a transverse structure disposed rearwardly of the tractor and having forwardly projecting arms supported on the pivots to permit vertical movement of the structure; power means on the tractor for raising and lowering the structure; a horizontal rod mounted on and extending across the structure defining a transverse horizontal pivot; an elongated tree-receiving member pivotally supported on the rod and having an opening at one side thereof for receiving a tree portion; an hydraulic cylinder fixed to move with the member and supported concentrically on the rod; a piston between the rod and cylinder; fluid inlet and discharge means associated with the rod and cylinder for effecting movement of the tree-receiving member transversely relative to the tractor; a tree shearing blade supported on the member for reciprocating motion across the tree-receiving opening; force-transmitting means between the member and blade for effecting the shearing action; a cable pulley on the transverse structure; a cable winch supported on the tractor between the tractor and structure and having a rearwardly extending cable played over the pulley with a free end rearwardly thereof.

3. A tree harvester supported on a tractor comprising: framework on the tractor including a pair of transverse pivots; a transverse structure disposed rearwardly of the tractor and having forwardly projecting arms supported on the pivots to permit vertical movement of the structure; power means on the tractor for raising and lowering the structure; an elongated tree-receiving member slidably supported on the transverse structure and having an opening at one side thereof for receiving a tree portion; an hydraulic cylinder fixed to move the member on the transverse structure; a tree shearing blade supported on the member for reciprocating motion across the tree receiving opening; force-transmitting means between the member and blade for effecting the shearing action; a cable pulley on the transverse structure; and a cable winch supported on the tractor between the tractor and structure and having a rearwardly extending cable played over the pulley with a free end rearwardly thereof.

4. A tree harvester supported on a tractor comprising: framework on the tractor including horizontal pivot means; a structure offset from the tractor and having arms supported on the pivots to permit vertical movement of the structure; power means on the tractor for raising and lowering the structure; an elongated tree-receiving member slidably supported on the structure to move transversely relative thereto and having an opening at one side thereof for receiving a tree portion, the member being also pivotally supported on the structure whereby the side may open forwardly and rearwardly; lock means on the structure adapted to selectively lock the member against pivotal movement; a tree shearing blade supported on the member for reciprocating motion across the opening; power means on the member effecting reciprocation of the blade; a cable pulley on the structure; and a cable winch supported on the tractor having a cable played over the pulley.

5. A tree harvester on a tractor comprising: a main frame on the rear portion of the tractor including horizontal transverse pivot means; a transverse structure disposed rearwardly of the tractor and having forwardly projecting arms supported on the pivot means to permit vertical movement of the structure; power means on the tractor for raising and lowering the structure; a horizontal rod mounted on and extending across the structure defining a transverse horizontal pivot; an elongated tree-receiving member pivotally supported on the rod and having an opening at one side thereof for receiving a tree portion; lock means for selectively fixing the member against pivotal movement about the rod; an hydraulic cylinder fixed to move with the member and supported concentrically on the rod; a piston between the rod and cylinder; fluid inlet and discharge means associated with the rod and cylinder for effecting movement of the tree-receiving member transversely relative to the tractor; a tree shearing blade supported on the member for reciprocating motion across the tree-receiving opening; and force-transmitting means between the member and blade for effecting the shearing action.

6. A tree harvester on a tractor comprising: a main frame on the rear portion of the tractor including a pair of transverse pivots; a transverse structure disposed rearwardly of the tractor and having forwardly projecting arms supported on the pivots to permit vertical movement of the structure; power means on the tractor for raising and lowering the structure; a horizontal rod mounted on and extending substantially the width of the structure defining a transverse horizontal pivot; an elongated tree-receiving member pivotally supported on the rod and having an opening at one side thereof for receiving a tree portion; an hydraulic cylinder fixed to move with the member and supported concentrically on the rod; a piston between the rod and cylinder; fluid inlet and discharge means associated with the rod and cylinder for effecting movement of the tree-receiving member transversely relative to the tractor; a tree shearing blade supported on the member for reciprocating motion across the tree-receiving opening; force-transmitting means between the member and blade for effecting the shearing action; and locking means between the structure and member for fixing the member against movement in one position in which the opening opens forwardly and a second position in which the opening opens rearwardly.

7. A tree harvester on a tractor comprising: a transverse structure disposed rearwardly of the tractor and having forwardly projecting arms pivotally supported to permit vertical movement of the structure; power means on the tractor for raising and lowering the structure; an elongated tree-receiving member slidably supported on the structure for transverse movement and having an opening at one side thereof for receiving a tree portion; an hydraulic cylinder fixed to move the member transversely on the structure; a tree shearing blade supported on the member for reciprocating motion across the tree-receiving opening; force-transmitting means between the member and blade for effecting the shearing action; and locking means between the structure and member for fixing the member against movement in one position in which the opening opens forwardly and a second position in which the opening opens rearwardly.

8. A tree harvester on a tractor comprising: a structure disposed adjacent the tractor and supported thereon to permit vertical movement relative to the tractor; power means on the tractor for raising and lowering the structure; a horizontal rod mounted on and extending substantially the length of the structure defining a horizontal pivot; an elongated tree-receiving member pivotally supported on the rod and having an opening at one side thereof for receiving a tree portion; an hydraulic cylinder fixed to move with the member and supported concentrically on the rod; a piston between the rod and cylinder; fluid inlet and discharge means associated with the rod and cylinder for effecting movement of the tree-receiving member axially along the rod; a tree shearing blade supported on the member for reciprocating motion across the tree-receiving opening; force-transmitting means between the member and blade for effecting the shearing action; a cable pulley on the structure concentric with the rod, a pair of transversely spaced vertical rollers on the structure rearwardly of and on opposite sides of the pulley; a cable winch supported on the tractor having an extending cable played over the pulley and between the rollers with a free end beyond the pulley.

9. A tree harvester on a tractor comprising: a structure disposed adjacent the tractor and supported thereon to permit vertical movement relative to the tractor; power means on the tractor for raising and lowering the structure; an elongated horizontal rod mounted on the structure defining a horizontal pivot; an elongated tree-receiving member pivotally supported on the rod and having an opening at one side thereof for receiving a tree portion; an hydraulic cylinder fixed to move with the member and supported concentrically on the rod; a piston between the rod and cylinder; fluid inlet and discharge means associated with the rod and cylinder for effecting movement of the tree-receiving member axially along the rod; a tree shearing blade supported on the member for reciprocating motion across the tree-receiving opening; force-transmitting means between the member and blade for effecting the shearing action; a cable pulley on the structure concentric with the rod; a cable winch supported on the tractor having an extending cable played over the pulley with a free end beyond the pulley; and guide means on the structure retaining the cable on the pulley.

10. The invention defined in claim 5 in which the lock means includes latches supported on the structure effective to lock the tree-receiving member in response to the member being pivoted to open both forwardly and rearwardly.

11. A tree harvester on a tractor comprising: a structure disposed adjacent the tractor and supported thereon to permit vertical movement relative to the tractor; power means on the tractor for raising and lowering the structure; horizontal cylinder and rod members, one of the members being mounted on and extending across the structure and defining a horizontal pivot; an elongated tree-receiving member pivotally supported on the other of the members and having an opening at one side thereof for receiving a tree portion; a piston between the rod and cylinder members; fluid inlet and discharge means associated with the rod and cylinder members for effecting movement of the tree-receiving member axially; means for locking the tree-receiving member at positions in which the aforesaid opening is open on opposite sides of the cylinder and rod members; a tree shearing blade supported on the member for reciprocating motion across the tree-receiving opening; force-transmitting means between the member and blade for effecting the shearing action; a cable guide means on the structure concentric with the rod; and a cable winch supported on the tractor having an extending cable played over the guide means with a free end beyond the guide means.

12. A tree harvester on a tractor comprising: a structure disposed adjacent the tractor and supported thereon to permit vertical movement relative to the tractor; power means on the tractor for raising and lowering the structure; horizontal rod and cylinder members movable axially and angularly relative to one another mounted on and extending across the structure; an elongated tree-receiving member supported to move with the movable of aforesaid members and having an opening at one side thereof for receiving a tree portion; a piston between the rod and cylinder members; fluid inlet and discharge means associated with the rod and cylinder members for effecting movement of the tree-receiving member axially; means for selectively locking the tree-receiving member on opposite sides of the rod and cylinder members and in positions whereby the aforesaid opening may open to opposite sides; a tree shearing blade supported on the member for reciprocating motion across the tree-receiving opening; and force-transmitting means between the member and blade for effecting the shearing action.

References Cited by the Examiner
UNITED STATES PATENTS

| | | |
|---|---|---|
| 2,542,952 | 2/51 | White. |
| 2,697,459 | 12/54 | McFaull _____ 144—34 |
| 2,845,101 | 7/58 | Hoadley _____ 144—34 |
| 2,876,816 | 3/59 | Busch et al. _____ 144—309 |
| 2,912,022 | 11/59 | Ver Ploeg et al. |
| 2,981,301 | 4/61 | Busch et al. |
| 3,059,677 | 10/62 | Busch et al. |

WILLIAM W. DYER, JR., *Primary Examiner.*

LEON PEAR, *Examiner.*